United States Patent
Seong et al.

(10) Patent No.: US 8,179,824 B2
(45) Date of Patent: May 15, 2012

(54) METHOD OF PERFORMING CHANNEL SOUNDING IN FREQUENCY DUPLEX SYSTEM

(75) Inventors: Doo Hyun Seong, Anyang-si (KR); Min Seok Oh, Anyang-si (KR); Jin Soo Choi, Anyang-si (KR); Seong Ho Moon, Anyang-si (KR); Eun Jong Lee, Anyang-si (KR); Kyu Jin Park, Anyang-si (KR); Jae Hoon Chung, Anyang-si (KR); Hyung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 12/594,663

(22) PCT Filed: May 2, 2008

(86) PCT No.: PCT/KR2008/002499
§ 371 (c)(1),
(2), (4) Date: Oct. 5, 2009

(87) PCT Pub. No.: WO2008/136609
PCT Pub. Date: Nov. 13, 2008

(65) Prior Publication Data
US 2010/0220614 A1  Sep. 2, 2010

(30) Foreign Application Priority Data
May 2, 2007  (KR) .................. 10-2007-0042701

(51) Int. Cl.
*H04J 1/00* (2006.01)

(52) U.S. Cl. ...................................................... 370/281
(58) Field of Classification Search .......... 370/203–210, 370/276, 281, 328–339
See application file for complete search history.

(56) References Cited

U.S. PATENT DOCUMENTS

| | | | |
|---|---|---|---|
| 6,269,092 B1 | 7/2001 | Schilling | |
| 7,924,935 B2* | 4/2011 | Tong et al. | 375/267 |
| 2005/0170781 A1 | 8/2005 | Jacobsen et al. | |
| 2006/0035643 A1* | 2/2006 | Vook et al. | 455/450 |
| 2008/0267271 A1* | 10/2008 | Vook et al. | 375/219 |
| 2009/0219875 A1* | 9/2009 | Kwak et al. | 370/329 |

OTHER PUBLICATIONS

Vook et al, Uplink Channel Sounding for TDD OFDMA, IEEE, 12 pages, Aug. 2004.*
Vook, Corrections for Supporting Multiple Sounding Zones, IEEE, 8 pages, Mar. 2008.*

* cited by examiner

*Primary Examiner* — Frank Duong
(74) *Attorney, Agent, or Firm* — Birch, Stewart, Kolasch & Birch, LLP

(57) ABSTRACT

A method of performing channel sounding in a frequency division duplex (FDD) system in which an uplink frame and a downlink frame use different frequency bands includes dividing a transmission bandwidth with respect to the uplink frame into a plurality of sounding zones, allocating at least one of the plurality of sounding zones to a user equipment and receiving a sounding signal from the user equipment through the allocated sounding zone. Inter-cell interference can be mitigated and overhead due to transmission of the sounding signal can be reduced.

7 Claims, 9 Drawing Sheets

METHOD OF PERFORMING CHANNEL SOUNDING IN FREQUENCY DUPLEX SYSTEM

TECHNICAL FIELD

The present invention relates to wireless communication and, more particularly, to a method of performing channel sounding in a wireless communication system.

BACKGROUND ART

Next-generation wireless communication system is required to transmit high-quality and high-capacity multimedia data at high speed under limited radio resources. In order to accomplish those requirements, inter-symbol interference and frequency selective fading need to be overcome while maximizing spectral efficiency.

To improve the performance of a wireless communication system, there has emerged a closed-loop transmission scheme employing channel quality information between a transmitter and a receiver. An adaptive modulation and coding (AMC) scheme is a technology where modulation and coding scheme is adjusted based on the channel quality information in order to increase link performance. The channel quality information can also be used by a transmitter in pre-processing data so as to reduce complexity of equalization process in a receiver.

In general, two kinds of methods are used in order to transmit channel quality information to a transmitter. The first method is based on feedback information transmitted from a receiver. The receiver measures channel quality and configures the channel quality as feedback information. A transmitter that has received the feedback information performs closed-loop transmission. For example, the feedback information can be the quantized form of measured channel quality.

The second method employs channel sounding. In general, channel sounding is based on reciprocity in a time division duplex (TDD) system. TDD is a method in which uplink transmission and downlink transmission share the same frequency, but occur at different times. In the TDD system, uplink channel and downlink channel are reciprocal. This is because, at a specific time-frequency, the downlink channel and the uplink channel are identical. Accordingly, channel quality of the uplink channel can be obtained from that of the downlink channel. A receiver sends a sounding signal to a transmitter through the uplink channel. The transmitter estimates channel quality of the downlink channel and the uplink channel from the sounding signal. The transmitter performs downlink transmission base on the estimated channel quality of the downlink channel.

Frequency division duplex (FDD) is a method in which uplink transmission and downlink transmission use different frequencies. In FDD, downlink channel and uplink channel are not reciprocal. Accordingly, channel quality of the downlink channel, which is obtained from feedback information, cannot be used as channel quality of the uplink channel.

To enable a base station to perform frequency-selective scheduling on uplink radio resources, the base station needs to know uplink channel quality. A user equipment uses a sounding signal for the base station to measure the uplink channel quality.

If a user equipment located at the edge of a cell transmits a sounding signal over the overall bandwidth, severe interference can be caused on neighboring cells. Further, the sounding signal over the overall bandwidth may function as transmission overhead.

In a FDD system, there is a need for a method for transmitting a sounding signal.

DISCLOSURE OF INVENTION

Technical Problem

A method is sought for providing a base station with uplink channel quality in a frequency division duplex (FDD) system.

Technical Solution

In an aspect, a method of performing channel sounding in a frequency division duplex (FDD) system in which an uplink frame and a downlink frame use different frequency bands is provided. The method includes dividing a transmission bandwidth with respect to the uplink frame into a plurality of sounding zones, allocating at least one of the plurality of sounding zones to a user equipment and receiving a sounding signal from the user equipment through the allocated sounding zone.

In another aspect, a method of enabling a user equipment to perform channel sounding in a wireless communication system is provided. The method includes transmitting a first sounding signal on a first sounding zone including a plurality of second sounding zones and transmitting a second sounding signal on each of the plurality of second sounding zones.

In still another aspect, a method of transmitting a sounding signal to a base station in a FDD system is provided. The method includes receiving a channel sounding message through a downlink frame, the channel sounding message including allocation of a sounding zone in an uplink frame and transmitting a sounding signal to a base station through the sounding zone.

ADVANTAGEOUS EFFECTS

In a FDD system in which an uplink frame and a downlink frame use different frequency bands, a user equipment transmits a sounding signal through a designated sounding zone. Accordingly, inter-cell interference can be mitigated and overhead due to transmission of the sounding signal can be reduced. The accuracy of channel quality can be increased by repeatedly performing channel sounding on sounding zones.

MODE FOR THE INVENTION

Figure 1:
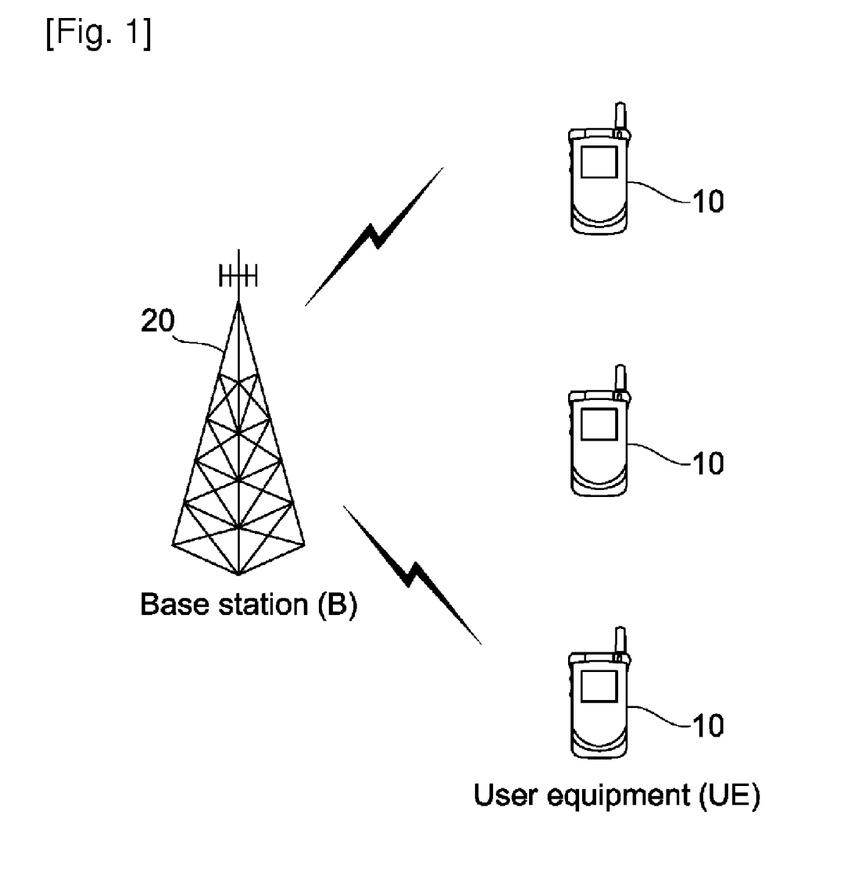
FIG. 1 is a block diagram showing a wireless communication system.

FIG. 1 is a block diagram showing a wireless communication system. Wireless communication systems are widely deployed in order to provide a variety of communication services such as voice and packet data.

Referring to FIG. 1, a wireless communication system includes a user equipment (UE) 10 and a base station (BS) 20. The base station 10 can be fixed or mobile and can also be called another terminology such as a mobile station (MS), a user terminal (UT), a subscriber station (SS) or a wireless device. The base station 20 generally refers to a fixed station communicating with the user equipments 10 and can also be called another terminology such as node-B, a base transceiver system (BTS) or an access point. One or more cells may exist in one base station 20.

Hereinafter, downlink refers to communication from the base station 20 to the user equipment 10 and uplink refers to communication from the user equipment 10 to the base station 20. In the downlink direction, a transmitter can be a part of the base station 20 and a receiver can be a part of the user equipment 10. In the uplink direction, a transmitter can be a part of the user equipment 10 and a receiver can be a part of the base station 20.

Figure 2:
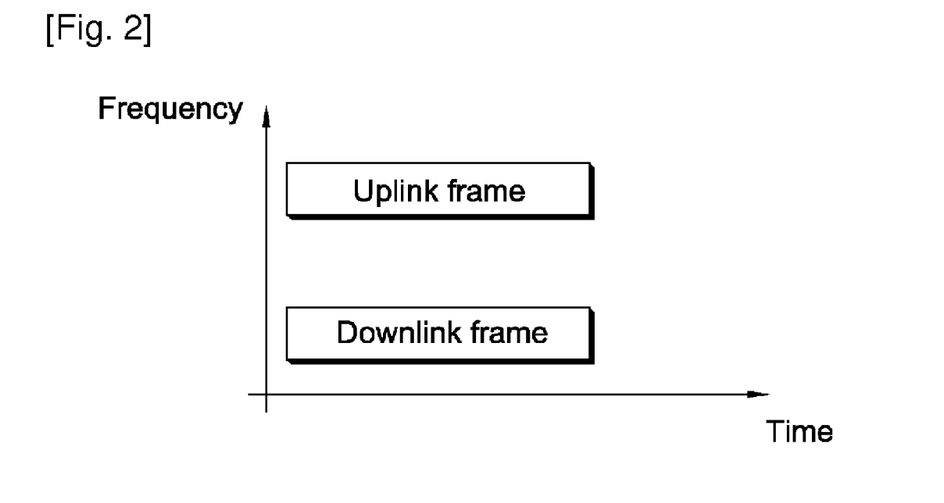
FIG. 2 illustrates the frame format of a FDD system.

FIG. 2 illustrates the frame format of a FDD system. A frame is a data sequence during a fixed time period, which is used by the physical specification.

Referring to FIG. 2, a frame includes a downlink frame and an uplink frame. The downlink frame and the uplink frame can be transmitted at the same time, but occupy different frequency bands. The deployment of the uplink frame and the uplink frame illustrated in FIG. 2 is only an example. The positions of the downlink frame and the uplink frame in the frequency domain can be changed and relative lengths thereof can also be changed.

Figure 3:
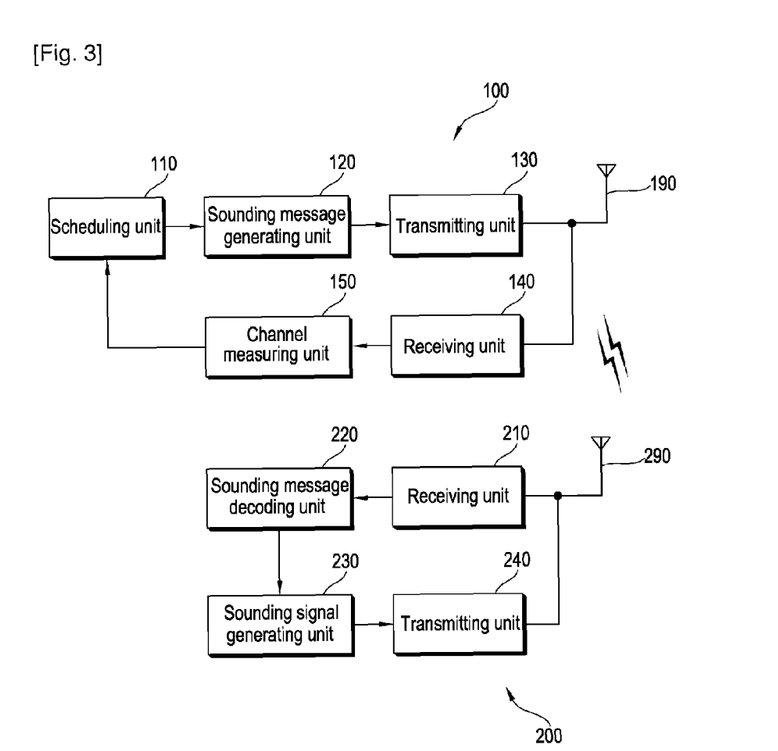
FIG. 3 is a block diagram showing a source sounding apparatus and a target sounding apparatus in accordance with an embodiment of the present invention.

FIG. 3 is a block diagram showing a source sounding apparatus and a target sounding apparatus in accordance with an embodiment of the present invention. The source sounding apparatus refers to a transceiver for assigning a sounding zone in order to assign radio resources for data transmission and receiving a sounding signal accordingly. The target sounding apparatus refers to a transceiver for transmitting a sounding signal through the sounding zone. In uplink transmission, the source sounding apparatus can be a part of a base station and the target sounding apparatus can be a part of a user equipment.

Referring to FIG. 3, a source sounding apparatus 100 includes a scheduling unit 110, a sounding message generating unit 120, a transmitting unit 130, a receiving unit 140 and a channel measuring unit 150. The scheduling unit 110 allocates a sounding zone through which a target sounding apparatus 200 transmits a sounding signal. The sounding message generating unit 120 generates a channel sounding message, including a sounding zone and parameters related to the sounding zone. The transmitting unit 130 transmits a channel sounding message through an antenna 190.

The sounding zone is time-frequency portion of a frame, which is dynamically allocated so that the target sounding apparatus 200 can transmit a sounding signal, in order for the source sounding apparatus 100 to measure a channel quality. When the source sounding apparatus 100 is a part of a base station and the target sounding apparatus 200 is a part of a user equipment, the sounding zone becomes a part of an uplink frame. The sounding signal in the uplink frame is a reference signal for uplink scheduling and is not associated with transmission of uplink traffic data or uplink control signal. On the contrary, demodulation reference signal is associated with transmission of the uplink traffic data or the uplink control signal and is used to demodulate the uplink traffic data or the uplink control signal. The reference signal is a signal known both the use equipment and the base station.

The receiving unit 140 receives a sounding signal, which is transmitted through an assigned sounding zone, from the target sounding apparatus 200. The channel measuring unit 150 measures a channel quality by employing a received sounding signal. A series of processes for measuring channel quality by employing the sounding signal is called channel sounding. The scheduling unit 110 decides radio resource assignment necessary for data transmission based on the channel quality. When the target sounding apparatus 200 requests radio resource assignment for data transmission, the source sounding apparatus 100 determines radio resources through the channel quality and informs the target sounding apparatus 200 of the determined radio resources through a radio resource assignment message.

The target sounding apparatus 200 includes a receiving unit 210, a sounding message decoding unit 220, a sounding signal generating unit 230, and a transmitting unit 240. The receiving unit 210 receives a channel sounding message through an antenna 290. The sounding message decoding unit 220 decodes a channel sounding message and obtains a sounding zone and parameters related to the sounding zone. The sounding signal generating unit 230 generates a preset sounding signal and assigns the generated sounding signal to each subcarrier within a sounding zone. The transmitting unit 240 transmits a sounding signal through a sounding zone.

Figure 4:
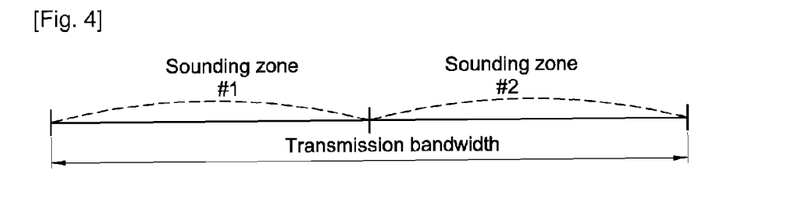
FIG. 4 illustrates an example of a sounding zone.

FIG. 4 illustrates an example of a sounding zone.

Referring to FIG. 4, a transmission bandwidth is divided into two sounding zones. The transmission bandwidth refers to the overall system bandwidth to which sounding zones are assigned in order to measure a channel quality. Hereinafter, the transmission bandwidth is described on the basis of the bandwidth of an uplink frame. The uplink frame can include a control channel which carries a control signal and a traffic channel which may carries user data or which carries both the user data and the control signal. The control channel may be called as a physical uplink control channel (PUCCH). The traffic channel may be called as physical uplink shared channel (PDSCH). The control channel is not transmitted simultaneously with the traffic channel from the same user equipment. The transmission bandwidth can include only frequency bandwidth assigned for the traffic channel or both frequency bandwidth assigned for the control channel and frequency bandwidth assigned for the traffic channel.

The size of the sounding zone can be set every frequency band such as 1.25 MHz or 2.5 MHz or can be set every resource block (RB) such as 1 RB or 2 RB. The resource block refers to 2-dimensional radio resources on the time domain and the frequency domain, including a plurality of subcarriers and a plurality of OFDM symbols, and can also be called other terminology such as a tile or bin.

The transmission bandwidth is divided into a plurality of sounding zones. A user equipment transmits a sounding signal only to a selected sounding zone. From the viewpoint of a base station, the amount of radio resources depending on transmission of a sounding signal can be reduced while maintaining frequency selective scheduling gain when compared with a case where a sounding signal with respect to the overall transmission bandwidth is received at once. Further, in a system, the capacity of a user equipment can be increased.

Figure 5:
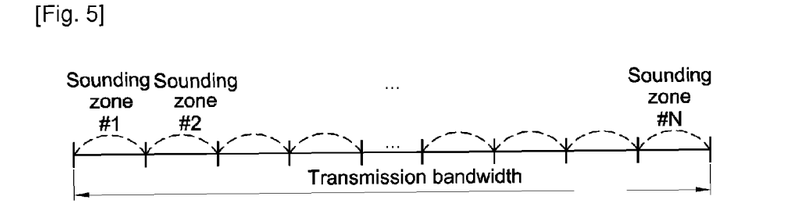
FIG. 5 illustrates another example of a sounding zone.

FIG. 5 illustrates another example of a sounding zone.

Referring to FIG. 5, a transmission bandwidth can be divided into a plurality of sounding zones. Here, the transmission bandwidth is divided into N (N>1) sounding zones. The number of sounding zones included in the transmission bandwidth is not limited.

Figure 6:
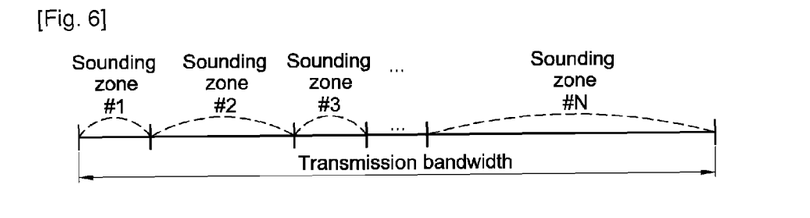
FIG. 6 illustrates still another example of a sounding zone.

FIG. 6 illustrates still another example of a sounding zone.

Referring to FIG. 6, a transmission bandwidth can be divided into a plurality of sounding zones. The size of each sounding zone may differ. The transmission bandwidth includes a plurality of sounding zones and the size of the sounding zones can be constant or different. Further, a base station can change the size or number of sounding zones according to the time.

A base station can apply one unified sounding zone setting rule to user equipments within a cell. For example, a transmission bandwidth can be divided into 10 sounding zones and each sounding zone can be assigned to a user equipment. Alternatively, a base station can apply different sounding zone setting rules to user equipments within a cell. For example, a transmission bandwidth, divided into 5 sounding zones, can be assigned to a first user equipment, and a transmission bandwidth, divided into 10 sounding zones, can be assigned to a second user equipment.

After according to which method will a sounding zone be set to each user equipment with respect to a transmission bandwidth (decide whether or not to apply one sounding zone setting rule to a cell or a different sounding zone setting rule to each user equipment), a sounding zone to be actually used by each user equipment is decided. For example, it is assumed that a base station sets two sounding zones having the same size, as illustrated in FIG. 4, and four user equipments UE1, UE2, UE3, and UE4 exist in a cell. If the base station assigns the first sounding zone to the first user equipment UE1 and the second user equipment UE2 and assigns the second sounding zone to the third user equipment UE3 and the fourth user equipment UE4, the four user equipments perform channel sounding only through the assigned sounding zones.

Figure 7:
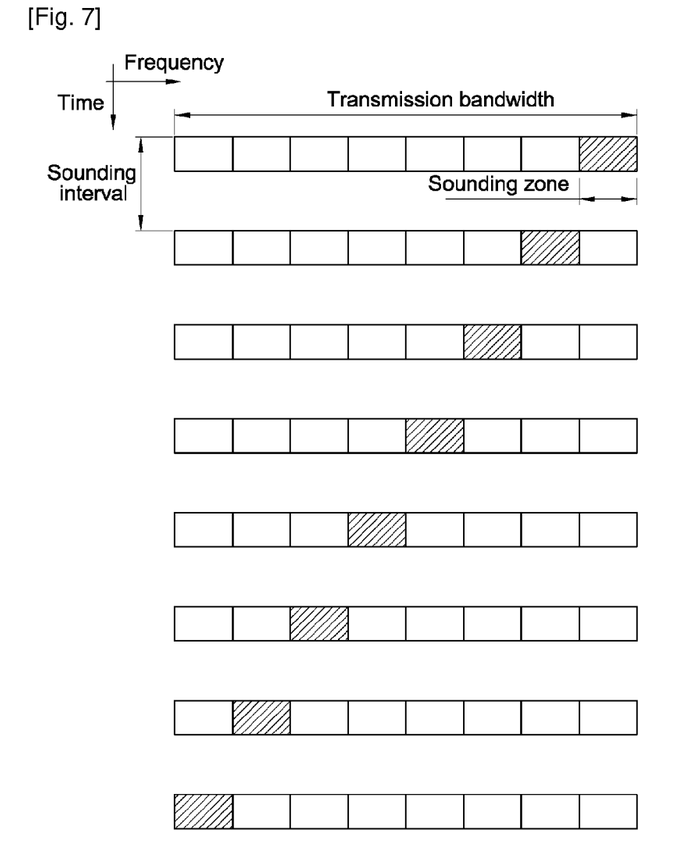
FIG. 7 illustrates a channel sounding method in accordance with an embodiment of the present invention.

FIG. 7 illustrates a channel sounding method in accordance with an embodiment of the present invention.

Referring to FIG. 7, a transmission bandwidth is divided into a plurality of sounding zones and a base station assigns one sounding zone to one user equipment. The user equipment transmits a sounding signal through a different sounding zone during each sounding interval. The user equipment transmits the sounding signal while shifting the sounding zone one by one every sounding interval. In the case in which a transmission bandwidth is divided into eight sounding zones, if eight sounding intervals elapse, the base station can obtain channel quality with respect to the transmission bandwidth by combining channel qualities in respective sounding zone.

The sounding interval is an interval where channel sounding is carried out and can be constant. A base station can change the sounding interval through a channel sounding message.

The method of dividing a transmission bandwidth into a plurality of sounding zones and combining channel qualities of the respective sounding zones in order to obtain the channel quality of the transmission bandwidth can take a longer time than the method of finding channel quality of the transmission bandwidth at once. In order for a base station to perform frequency selective scheduling, only a frequency band having a good channel is required. However, if a sounding signal with respect to a transmission bandwidth is unnecessarily transmitted always, it may cause overhead. Further, if a user equipment located at the edge of a cell transmits a sounding signal with respect to the transmission bandwidth, it may cause interference among neighboring cells. Accordingly, if a sounding signal is transmitted through each sounding zone, inter-cell interference can be eliminated or mitigated when a proper scheduling between cells is supported.

Figure 8:
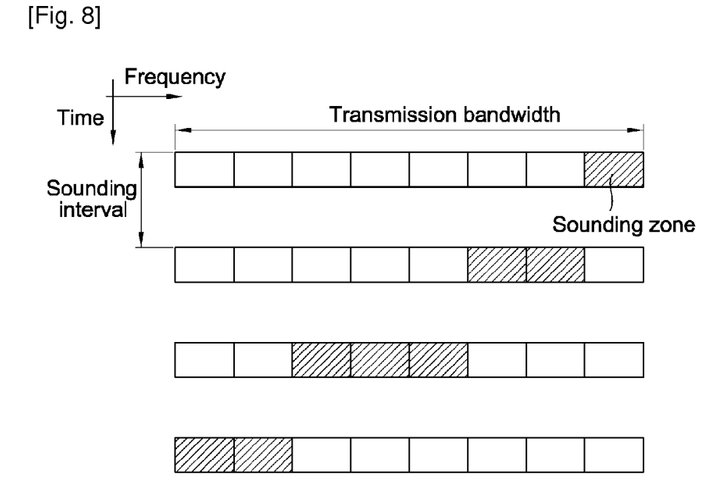
FIG. 8 illustrates an example of a channel sounding method in accordance with another embodiment of the present invention.

FIG. 8 illustrates an example of a channel sounding method in accordance with another embodiment of the present invention.

Referring to FIG. 8, a sounding zone can have a different size in each sounding interval. Here, this embodiment shows that the size of a sounding zone is different depending on the time and channel quality with respect to a transmission bandwidth can be found over four sounding intervals.

Flexibility depending on assignment of a sounding zone can be increased by adaptively adjusting the sounding zone depending on the time. A base station can assign the size of a sounding zone to a user equipment, or a user equipment can request the size of a sounding zone from a base station.

The above example corresponds to a case where one user equipment transmits a sounding signal through one sounding zone. A case where a plurality of user equipments transmits sounding signals through one sounding zone is now taken into consideration. Although a plurality of user equipments transmits sounding signals through one sounding zone, a base station needs to determine which user equipment has sent the sounding signal. It can be accomplished through orthogonality in the at least one of frequency domain, orthogonality in the time domain and orthogonality in the code domain.

Figure 9:
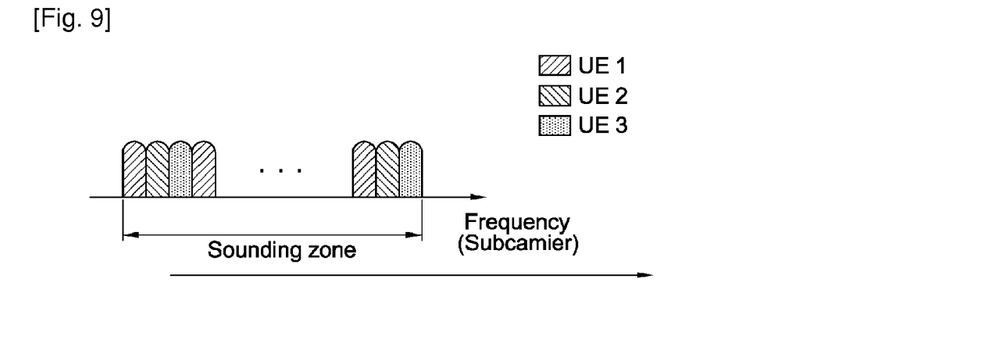
FIG. 9 illustrates an example of a multiplexing method of a sounding signal.

FIG. 9 illustrates an example of a multiplexing method of a sounding signal.

Referring to FIG. 9, different user equipments are assigned subcarriers of a comb-form for a sounding zone in the frequency domain. Sequences for sounding signals are mapped to the subcarriers, respectively. The sounding signals with respect to different user equipments are transmitted through different subcarriers.

The sounding signal is assigned a subcarrier within the sounding zone at specific intervals. The sounding signals of different user equipments are assigned subcarriers at specific subcarrier intervals within the sounding zone, but have different starting offsets. For example, a first user equipment UE1 can transmit a sounding signal at three subcarrier intervals, beginning with a first subcarrier. A second user equipment UE2 can transmit a sounding signal at three subcarrier intervals, beginning with a second subcarrier. A third user equipment UE3 can transmit a sounding signal at three subcarrier intervals, beginning with a third subcarrier. Here, only three user equipments are illustrated, but the subcarrier interval and the number of user equipments assigned in the sounding zone can be set in various ways. The sounding signals of different user equipments are not overlapped in the frequency domain, so that orthogonality is maintained in the frequency domain. Accordingly, this is called frequency division multiplexing (FDM).

Although multiple sounding signals are transmitted through one sounding zone, the sounding signal of each user equipment occupies a different subcarrier. Accordingly, a base station can discriminate the sounding signal of the user equipment.

Figure 10:
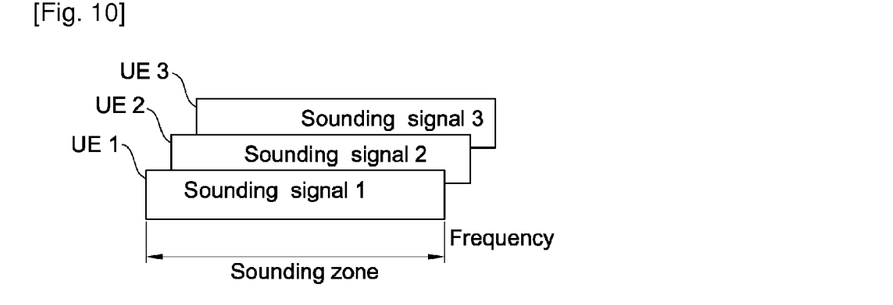
FIG. 10 illustrates another example of a multiplexing method of a sounding signal.

FIG. 10 illustrates another example of a multiplexing method of a sounding signal.

Referring to FIG. 10, sounding signals of different user equipments use the entire subcarriers within one sounding zone. The sounding signals of different user equipments are orthogonal to each other in the code domain. That is, the sounding signals of different user equipments maintain orthogonality in the code domain. A base station can identify the sounding signal of each user equipment from a multiplexed sounding signal by employing the correlation characteristic of an orthogonal sounding signal. This is called code division multiplexing (CDM).

The sounding signal can employ an orthogonal symbol, such as a constant amplitude zero auto-correlation (CAZAC) sequence or a Walsh code. The CAZAC sequence generally includes two kinds of generalized chirp like (GCL) CAZAC and ZC (Zadoff-Chu) CAZAC sequences. The two kinds of sequences have a mutual conjugate relationship. For example, the ZC CAZAC sequence can be obtained by applying a conjugate to the GCL CAZAC sequence.

In ZC CAZAC sequence, the k-th element c(k) of a root ZC sequence which corresponds to a root index M may be expressed as shown:

Math Figure 1

$$c(k) = \exp\left\{-\frac{j\pi Mk(k+1)}{N}\right\}, \text{ for } N \text{ odd} \qquad [\text{Math. 1}]$$

$$c(k) = \exp\left\{-\frac{j\pi Mk^2}{N}\right\}, \text{ for } N \text{ even}$$

where N is the length of the root ZC sequence, the root index M is relatively prime to N. If N is a prime number, the number of root indexes of the ZC sequence would be N−1.

The ZC CAZAC sequence c(k) has the following three characteristics.

Math Figure 2

$$|c(k)| = 1 \text{ for all } k, N, M \qquad [\text{Math. 2}]$$

Math Figure 3

$$R_{M;N}(d) = \begin{cases} 1, & \text{for } d = 0 \\ 0, & \text{for } d \neq 0 \end{cases} \qquad [\text{Math. 3}]$$

Math Figure 4

$$R_{M_1,M_2;N}(d) = const \text{ for all } M_1, M_2 \qquad [\text{Math. 4}]$$

Equation 2 means that the size of the ZC sequence is always 1, and Equation 3 means that auto-correlation of the ZC sequence is expressed as a Dirac-delta function. Here, the auto-correlation is based on circular correlation. Equation 4 means that cross correlation is always a constant. The ZC CAZAC sequences are orthogonal with each other when those are cyclic-shifted or have different root indexes.

When the CAZAC sequence is used as a sounding signal, the orthogonality of a sounding signal can be obtained by cyclic-shifting the CAZAC sequence with respect to different user equipments and differentiating an root index with respect to different cells.

Figure 11:
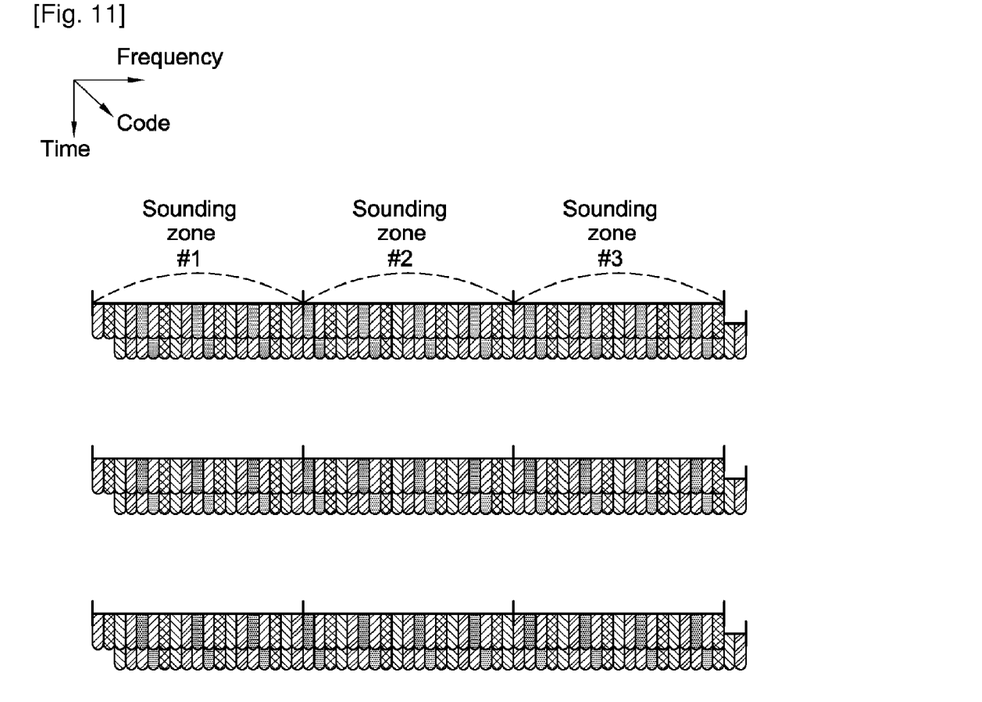
FIG. 11 illustrates still another example of a multiplexing method of a sounding signal.

FIG. 11 illustrates still another example of a multiplexing method of a sounding signal.

Referring to FIG. 11, this example is a method in which FDM and CDM are combined. The capacity of multiplexed user equipments can be increased by combining FDM and CDM.

Although a sounding zone is constant depending on the time in this drawing, the sounding zone can have a different size depending on the time.

Hereinafter, a method of setting a sounding zone every user equipment is described below.

Figure 12:
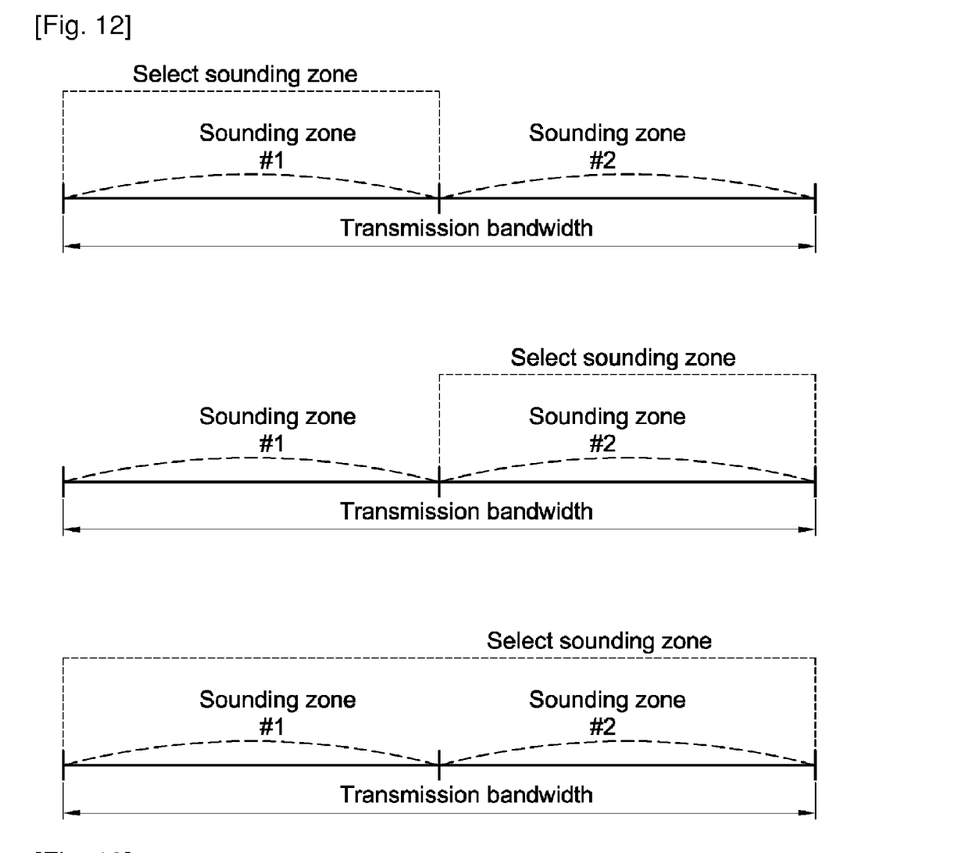
FIG. 12 is a diagram illustrating a method of setting a sounding zone in accordance with an embodiment of the present invention.

FIG. 12 is a diagram illustrating a method of setting a sounding zone in accordance with an embodiment of the present invention. This method is called a random sounding zone setting method.

Referring to FIG. 12, a base station randomly sets a sounding zone per on a user-equipment basis. When N sounding zones exist, a base station can select 1 to N sounding zones and inform a user equipment of the result. In this case, the number of settable sounding zones is obtained as shown:

Math Figure 5

$$N_C = \sum_{i=1}^{N} {}_N C_i \qquad [\text{Math. 5}]$$

where $N_C$ is the number of sounding zones that can be combined, and N is a total number of sounding zones included in a transmission bandwidth.

For example, in the case in which a transmission bandwidth is divided into two sounding zones, the number of the sounding zones that can be combined is $_2C_1 + _2C_2 = 3$. The embodiment of FIG. 12 illustrates three kinds of possible sounding zones.

The sounding zone can be changed at specific intervals, and a change interval is flexible according to a change depending on the time of a radio channel. Sounding zone hopping is also possible. This sounding zone hopping can be performed according to a predetermined hopping pattern and the hopping pattern can be set randomly.

Figure 13:
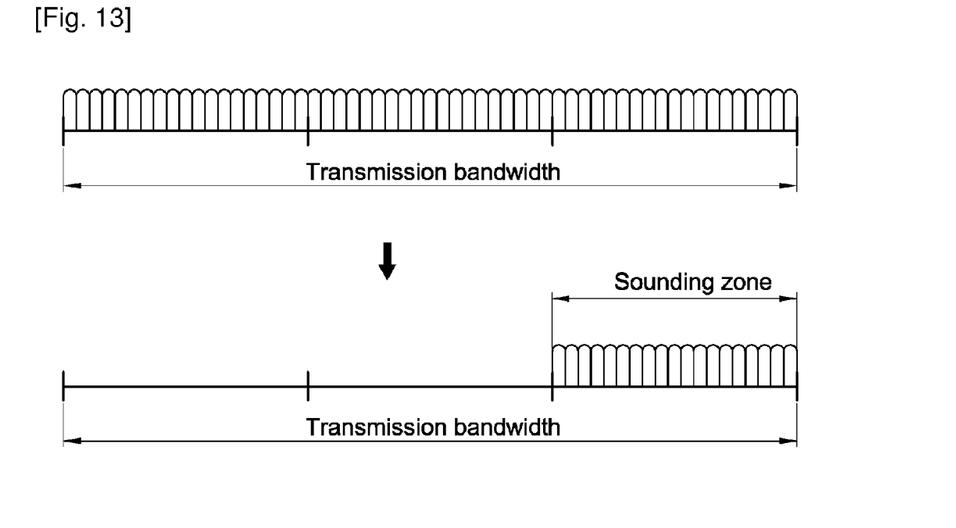
FIG. 13 is a diagram illustrating a method of setting a sounding zone in accordance with another embodiment of the present invention.

FIG. 13 is a diagram illustrating a method of setting a sounding zone in accordance with another embodiment of the present invention. In this method, channel information about a broad frequency band (a first frequency band) is obtained by performing channel sounding on the broad frequency band and a narrow frequency band (a second frequency band), divided from the broad frequency band, is selected as a sounding zone.

Referring to FIG. 13, first, a base station performs channel sounding on a transmission bandwidth in order to obtain channel quality with respect to the transmission bandwidth. At this time, if a user equipment sends a sounding signal with respect to the entire transmission bandwidths to the base station, the base station can find channel quality with respect to the transmission bandwidth. Alternatively, the base station can find the channel quality with respect to the transmission bandwidth by combining the sounding signals of sounding zone.

Next, the base station sets a sounding zone to each user equipment based on the channel quality with respect to the transmission bandwidth. The base station can know the channel quality with respect to each sounding zone since it has already known the channel quality with respect to the transmission bandwidth. Accordingly, the base station can designate a proper sounding zone according to a quality of service (QoS), a priority, etc. of each user equipment. The random sounding zone setting method may not be suitable for frequency selective scheduling because a sounding zone is determined without considering the status of an uplink channel. A user equipment can determine whether or not to change a sounding zone in consideration of the channel status of the sounding zone by performing channel sounding on a transmission bandwidth according to a predetermined sounding zone change interval.

Figure 14:
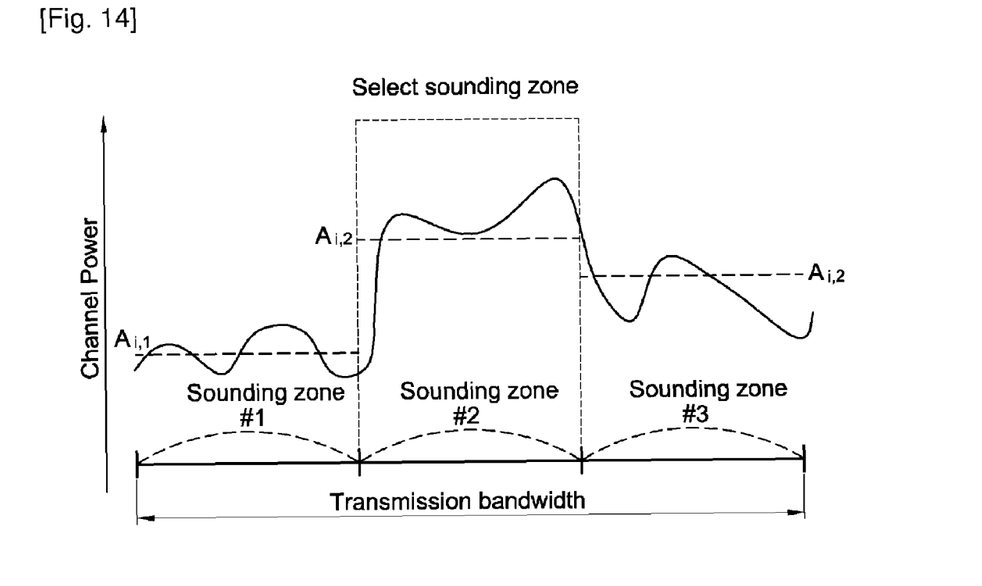
FIG. 14 is a diagram illustrating a method of selecting a sounding zone.

FIG. 14 is a diagram illustrating a method of selecting a sounding zone.

After channel sounding is performed on the transmission bandwidth, the base station can find a channel quality with respect to each sounding zone. In order to decide a sounding zone with respect to an i-th user equipment, a priority can be utilized. The priority can be decided as shown:

MathFigure 6

$$P_{i,k}(t) = aA_{i,k}(t) + (1-a)P_{i,k}(t-1) \quad \text{[Math.6]}$$

where $P_{i,k}(t)$ denotes the priority of a k-th sounding zone of a first user equipment at the time t, $P_{i,k}(t-1)$ denotes the priority of the k-th sounding zone of the first user equipment at the time (t−1), $A_{i,k}(t)$ denotes an average channel quality value of the k-th sounding zone of the i-th user equipment, and 'a' denotes a weight factor having a value between 0 and 1.

At the time t, the base station finds the average channel quality value $A_{i,k}(t)$ per on a user-equipment basis and per on a sounding-zone basis. The base station calculates the priority $P_{i,k}(t)$ of each sounding zone based on the average channel quality value $A_{i,k}(t)$. The priority $P_{i,k}(t)$ is a combination of $A_{i,k}(t)$ and $P_{i,k}(t-1)$ to which the weight factor 'a' has been applied. When a=1, the priority $P_{i,k}(t)$ is decided depending on only a current channel status $A_{i,k}(t)$ of the sounding zone.

In the example of FIG. 14, a second sounding zone has the highest average channel quality value $A_{i,k}(t)$ and has the highest priority $P_{i,k}(t)$ in consideration of a previous priority $P_{i,k}(t-1)$. Therefore, the second sounding zone is selected as the sounding zone of the i-th user equipment.

Two or more sounding zones can be selected with respect to one user equipment. In this case, the sounding zones can be sequentially selected beginning with a sounding zone having the highest priority $P_{i,k}(t)$.

Figure 15:
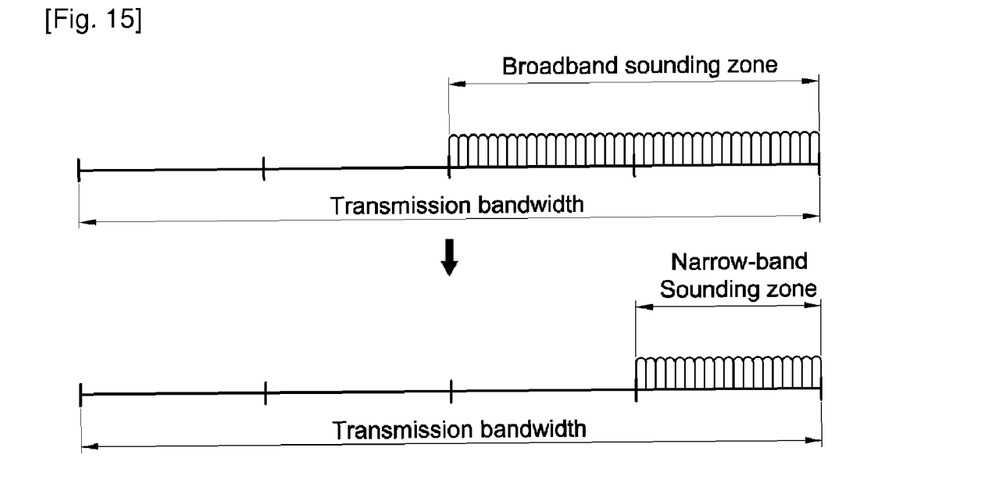
FIG. 15 is a diagram illustrating a method of setting a sounding zone in accordance with still another embodiment of the present invention.

FIG. 15 is a diagram illustrating a method of setting a sounding zone in accordance with still another embodiment of the present invention.

Referring to FIG. 15, first, a base station finds channel quality with respect to a broadband sounding zone by performing channel sounding on the broadband sounding zone. The broadband sounding zone is a sounding zone narrower than a transmission bandwidth. The broadband sounding zone includes a plurality of narrow-band sounding zones. Channel quality with respect to a broadband sounding zone can be found through once broadband sounding, or channel quality with respect to a broadband sounding zone can be found by performing narrow-band sounding and then combining channel qualities of narrow-band sounding zones.

Next, the base station sets a narrow-band sounding zone with respect to each user equipment on the basis of the channel quality with respect to the broadband sounding zone. The base station can measure channel quality with respect to a narrow-band sounding zone, included in the broadband sounding zone, because it has already measured the channel quality with respect to the broadband sounding zone. The base station can designate a proper narrow-band sounding zone depending on the quality of service (QoS), priority, etc. of each user equipment.

In the example of FIG. 15, the transmission bandwidth is divided into the two broadband sounding zones and one broadband sounding zone includes two narrowband sounding zones. However, the example is not limited, and the number and size of the broadband sounding zone and the number and size of the narrow-band sounding zone may vary depending on the system. The size of the broadband sounding zone may be different. The size of the narrow-band sounding zone may be different.

The example of FIG. 15 illustrates that the broadband sounding zone is a set of locally crowded narrow-band sounding zones. However, the broadband sounding zone can include a plurality of narrow-band sounding zones distributed on a transmission bandwidth.

The base station can change the broadband sounding zone and/or the narrow-band sounding zones at specific intervals. The change interval can be flexibly changed according to a change depending on the time of a radio channel. It is preferred that the change interval of the broadband sounding zone is set longer than that of the narrowband sounding zone. Broadband sounding zone hopping or narrow-band sounding zone hopping is also possible. This broadband sounding zone hopping or narrow-band sounding zone hopping is also possible can be carried out according to a predetermined hopping pattern. The hopping pattern can be set randomly.

Figure 16:
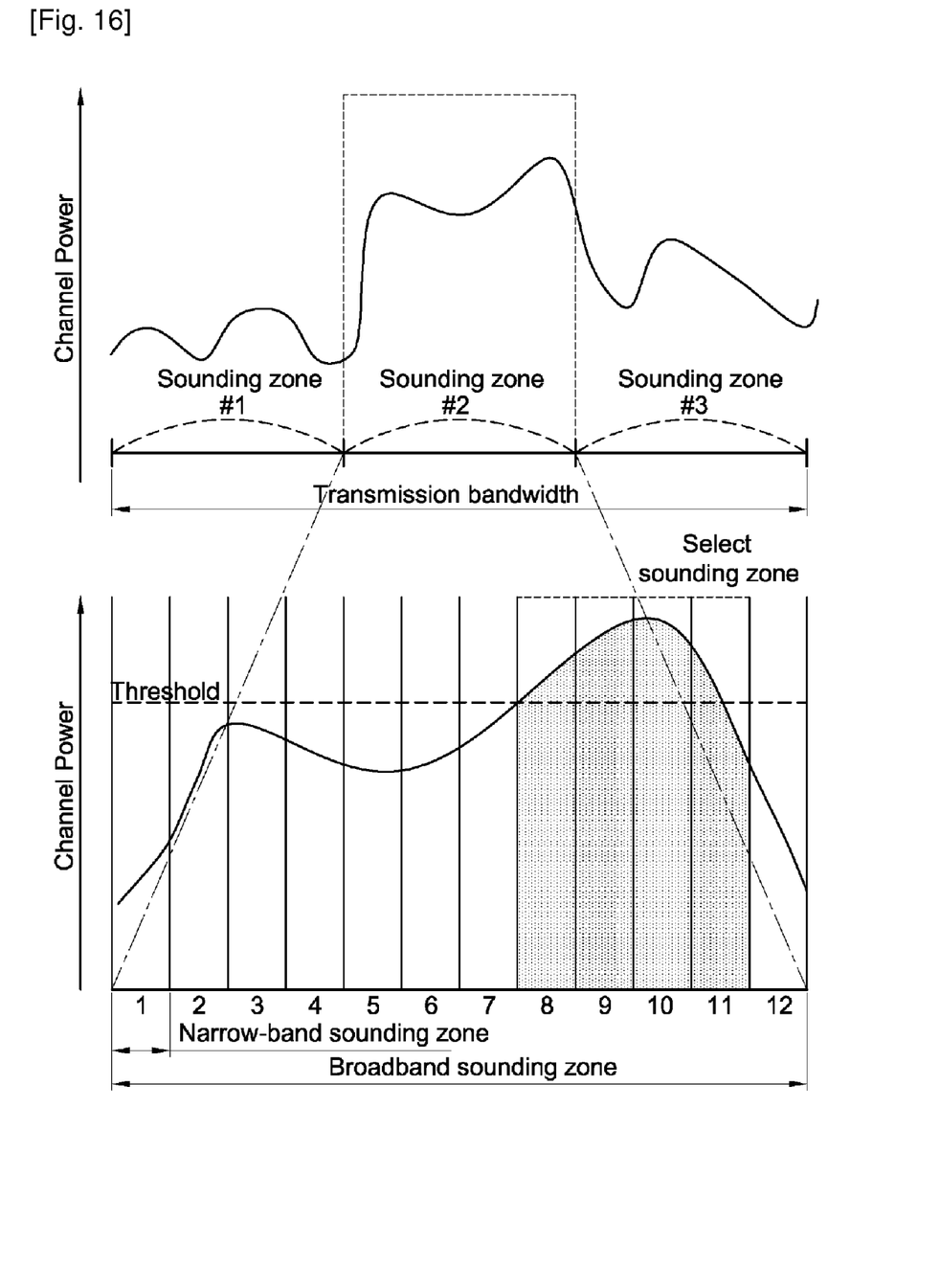
FIG. 16 is a diagram illustrating a method of selecting a narrow-band sounding zone from a broadband sounding zone.

FIG. 16 is a diagram illustrating a method of selecting a narrow-band sounding zone from a broadband sounding zone.

Referring to FIG. 16, it is assumed that a transmission bandwidth is divided into three broadband sounding zones and each broadband sounding zone includes 12 narrow-band sounding zones. In an embodiment, a base station can select an arbitrary narrow-band sounding zone so that a user equipment can perform narrow-band sounding. Alternatively, the base station can inform the user equipment of a set of predetermined narrow-band sounding zones so that the user equipment can perform narrow-band sounding within the set of narrow-band sounding zones. The set of the narrow-band sounding zones can include at least one narrow-band sounding zone. In another embodiment, a base station can find channel quality of a broadband sounding zone through broadband sounding and then select a narrow-band sounding zone on the basis of the channel quality of the broadband sounding zone. The base station can arrange narrow-band sounding zones in order of better channels and select the narrowband sounding zones as many as a predetermined number on an upper place, or can set a threshold value and select narrow-band sounding zones having a channel quality value higher than the threshold value.

In the example of FIG. 16, a broadband sounding zone is first selected by performing channel sounding on a transmission bandwidth. In the case in which the second broadband sounding zone is selected, four narrow-band sounding zones 8, 9, 10, and 11 having a channel quality value higher than a predetermined threshold value, of the 12 narrow-band sounding zones included in the second broadband sounding zone, are selected.

After receiving a set of the narrow-band sounding zones with respect to the four narrow-band sounding zones, a user equipment performs narrow-band sounding. The narrow-band sounding refers to transmission of a sounding signal through a narrowband sounding zone. Narrow-band sounding can be performed in various ways. In an embodiment, during one sounding interval, sounding signals can be transmitted through the entire narrow-band sounding zones within a set of narrow-band sounding zones.

In the example of FIG. 16, a user equipment can transmit a sounding signal using the entire frequency bands from the narrow-band sounding zone 8 to the narrow-band sounding zone 11. In another embodiment, during a plurality of sounding intervals, narrow-band sounding can be performed sequentially every narrow-band-sounding zone. In the example of FIG. 16, a user equipment can perform sounding on the narrow-band sounding zone 8 during the first sounding interval and perform sounding on the narrow-band sounding zone 9 during a next sounding interval. If a total of four sounding intervals elapse, sounding on the entire narrow-band sounding zones within a set of the narrow-band sounding zones can be completed.

Figure 17:
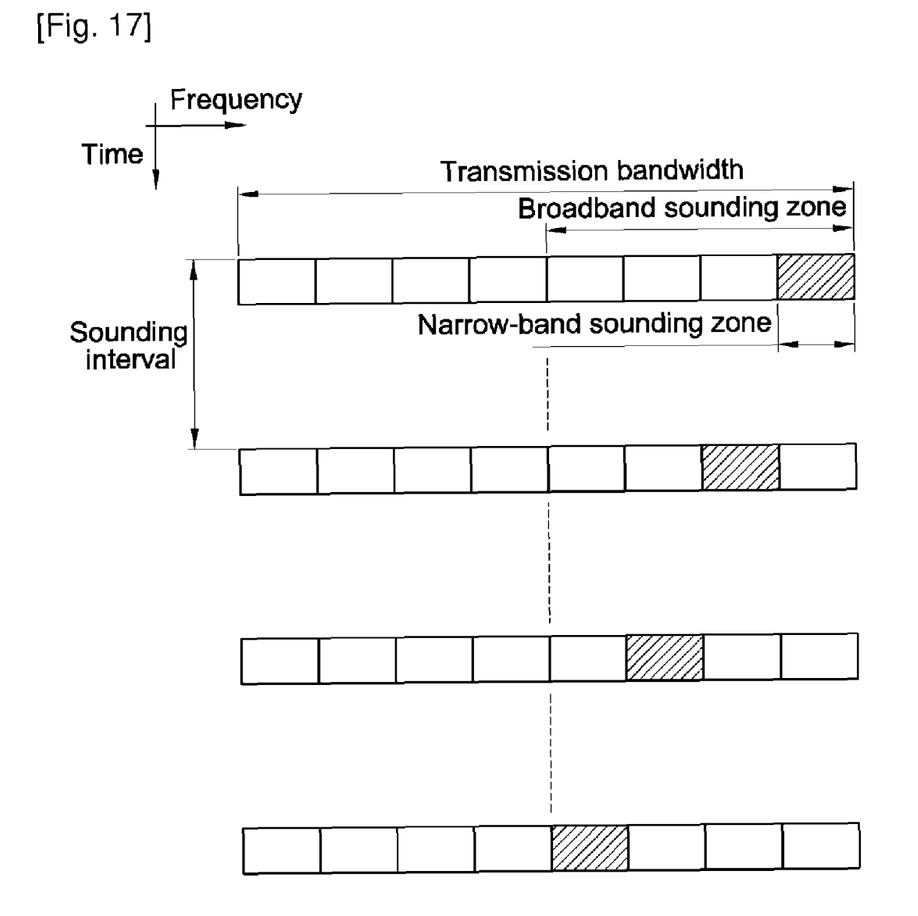
FIG. 17 illustrates a channel sounding method in accordance with an embodiment of the present invention.

FIG. 17 illustrates a channel sounding method in accordance with an embodiment of the present invention.

Referring to FIG. 17, it is assumed that a transmission bandwidth is divided into two broadband sounding zones and each broadband sounding zone includes four narrowband sounding zones. A base station informs a user equipment of an assigned broadband sounding zone. The user equipment transmits a sounding signal during each sounding interval through a different narrow-band sounding zone. The user equipment transmits the sounding signal while shifting the sounding zones during each sounding interval. In the case in which the broadband sounding zone is divided into four narrowband sounding zones, after four sounding intervals elapse, the base station can obtain channel quality with respect to one broadband sounding zone.

When compared with the embodiment of FIG. 7, limited sounding is performed within the broadband sounding zone. Thus, the time and frequency resources necessary for sounding per user equipment can be reduced. This can have an effect that extends the number of user equipments capable of performing sounding at once within a cell. By selecting the narrow-band sounding zone through broadband sounding, a multi-user diversity gain employing frequency selectivity can be obtained even with limited narrow-band sounding. If sounding is performed repeatedly within a limited sounding zone, the accuracy of channel estimation for data transmission can be increased.

Here, it has been illustrated that the size of the narrow-band sounding zone is constant depending on the time. However, the size of the narrow-band sounding zone can vary depending on the time. The size of the narrow-band sounding zone can vary every sounding interval. The size of the broadband sounding zone can also vary depending on the time.

Figure 18:
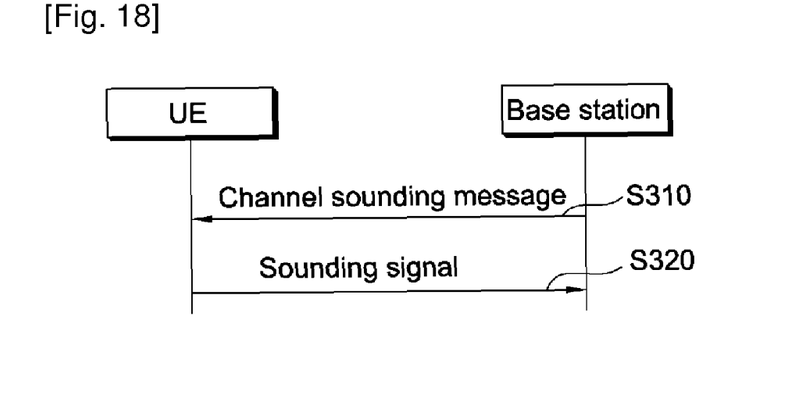
FIG. 18 is a flowchart illustrating a channel sounding method in accordance with an embodiment of the present invention.

FIG. 18 is a flowchart illustrating a channel sounding method in accordance with an embodiment of the present invention.

Referring to FIG. 18, a base station transmits a channel sounding message to a user equipment (S310). The user equipment decodes the received channel sounding message and transmits a sounding signal to the base station by employing parameters, included in the channel sounding message, and a designated sounding zone (S320).

The channel sounding message designates a sounding zone with respect to an uplink frame. The channel sounding message can be a L1/L2 control message or a radio resource control (RRC) message. The channel sounding message can be transmitted through a dedicated control channel or a broadcast channel. The channel sounding message can include a sounding zone parameter, a sounding signal parameter, a multiplexing mode parameter, and a multi-antenna parameter.

The sounding zone parameter denotes the length and/or location of a sounding zone in the uplink frame. The sounding zone can consist of 1 level or a multi-level. 1 level refers to that the transmission bandwidth of an uplink frame is divided into a plurality of sounding zones. 2 level refers to that the transmission bandwidth of an uplink frame is divided into a plurality of broadband sounding zones and the broadband sounding zone is again divided into a plurality of narrow-band sounding zones. 3 level or more are also possible.

The sounding signal parameter denotes a parameter for creating a sounding signal transmitted through a sounding zone. For example, the sounding signal parameter can include a parameter for creating the CAZAC sequence.

The multiplexing mode parameter is a parameter, regarding a scheme used to multiplex a sounding signal. The multiplexing mode parameter can include a flag indicating FDM or CDM. In the case of FDM, the multiplexing mode parameter can include a subcarrier distance, and a parameter concerned with a starting offset. In the case of CDM, the multiplexing mode parameter can include an index or cyclic shift value of the CAZAC sequence.

The multi-antenna parameter indicates whether a user equipment performs sounding by employing a multi-antenna. In a system employing a multi-antenna, channel quality has to be found per on an antenna basis.

Figure 19:
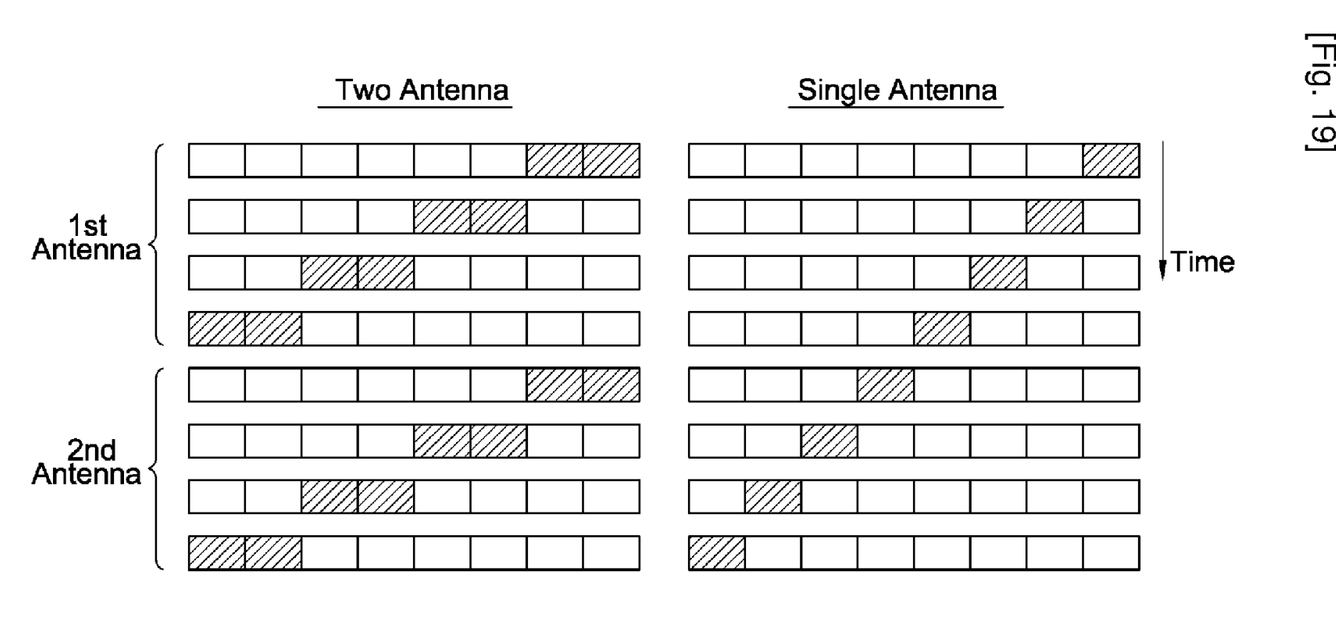
FIG. 19 is a diagram illustrating channel sounding with respect to a single antenna and a multi-antenna.

FIG. 19 is a diagram illustrating channel sounding with respect to a single antenna and a multi-antenna. In order to clarify the description, it is assumed that the multi-antenna includes two antennas.

Referring to FIG. 19, in the case of a single antenna, a transmission bandwidth is divided into eight sounding zones and a base station assigns one sounding zone to one user equipment. The user equipment transmits a sounding signal through a different sounding zone during each sounding interval. After eight sounding intervals elapse, the base station can obtain channel quality with respect to the transmission bandwidth by combining channel qualities in the respective sounding zones.

In the case of the two antennas, if a sounding signal is transmitted through one sounding zone every antenna, a total of 16 sounding intervals are required. This can take too long time necessary for sounding. Therefore, in the case in which channel sounding is performed using a multi-antenna, the number of sounding zones that are sounded at once can be increased. That is, when a sounding signal is transmitted with respect to two sounding zones at the time of once sounding, sounding on two antennas can be performed during eight sounding intervals.

This is only illustrative. In the case of a multi-antenna system, channel sounding can be carried out using various methods. The size of a sounding zone can be different every antenna and the size of a sounding zone can also be different depending on the time. FDM or CDM can be applied by treating each antenna like each user equipment.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of performing channel sounding in a frequency division duplex (FDD) system in which an uplink frame and a downlink frame use different frequency bands, the method comprising:
dividing a transmission bandwidth with respect to the uplink frame into a plurality of sounding zones;
performing the channel sounding by receiving a first sounding signal from a user equipment through the transmission bandwidth;
allocating at least one of the plurality of sounding zones to the user equipment, the at least one of the plurality of sounding zones being determined based on the priority of each of the plurality of sounding zones for the user equipment; and
performing the channel sounding by receiving a second sounding signal from the user equipment through the allocated at least one of the plurality of sounding zones.

2. The method of claim 1, wherein the size of the transmission bandwidth is less than that of frequency bandwidth assigned to the uplink frame.

3. The method of claim 1, wherein the plurality of sounding zones have constant sizes.

4. The method of claim 1, wherein the plurality of sounding zones have different sizes.

5. The method of claim 1, wherein the priority of each of the plurality of sounding zones for the user equipment is determined based on a priority of each of the plurality of sounding zones for the user equipment at a previous sounding interval, an average channel quality value of each of the plurality of sounding zones for the user equipment, and a weight factor.

6. The method of claim 5, wherein the priority of each of the plurality of sounding zones for the user equipment is determined based on the equation below:

$$P_{i,k}(t) = a \cdot A_{i,k}(t) + (1-a) \cdot P_{i,k}(t-1),$$

where $P_{i,k}(t)$ denotes the priority of each of the plurality of sounding zones for the user equipment, 'a' denotes the weight factor, $A_{i,k}(t)$ denotes the average channel quality value of each of the plurality of sounding zones for the user equipment, and $P_{i,k}(t-1)$ denotes the priority of each of the plurality of sounding zones for the user equipment at a previous sounding interval.

7. The method of claim 5, wherein the weight factor has a value between 0 and 1.

* * * * *